(12) United States Patent
Yang et al.

(10) Patent No.: US 12,508,578 B2
(45) Date of Patent: *Dec. 30, 2025

(54) CATALYST COMPOSITION COMPRISING MAGNETIC MATERIAL ADAPTED FOR INDUCTIVE HEATING

(71) Applicant: BASF MOBILE EMISSIONS CATALYSTS LLC, Iselin, NJ (US)

(72) Inventors: Xiaofan Yang, Westfield, NJ (US); Matthew Tyler Caudle, Hamilton Township, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,311

(22) Filed: May 19, 2023

(65) Prior Publication Data

US 2024/0024860 A1 Jan. 25, 2024

Related U.S. Application Data

(63) Continuation of application No. 16/184,162, filed on Nov. 8, 2018, now Pat. No. 11,697,110, which is a
(Continued)

(51) Int. Cl.
*B01J 23/745* (2006.01)
*B01D 53/86* (2006.01)
(Continued)

(52) U.S. Cl.
CPC ............ *B01J 29/763* (2013.01); *B01D 53/86* (2013.01); *B01D 53/9418* (2013.01);
(Continued)

(58) Field of Classification Search
CPC ........ B01J 29/763; B01J 23/745; B01J 23/83; B01J 23/89; B01J 23/894; B01J 35/0013;
(Continued)

(56) References Cited

U.S. PATENT DOCUMENTS 6,890,670 B2 * 5/2005 Leddy .................... C04B 35/01
427/127
7,595,495 B2 * 9/2009 Akashi ................ B01J 19/0093
210/205

(Continued)

*Primary Examiner* — Cam N. Nguyen
(74) *Attorney, Agent, or Firm* — DLA Piper LLP (US)

(57) ABSTRACT

The invention provides a catalyst composition, including a mixture of catalytically active particles and a magnetic material, such as superparamagnetic iron oxide nanoparticles, capable of inductive heating in response to an applied alternating electromagnetic field. The catalytically active particles will typically include a base metal, platinum group metal, oxide of base metal or platinum group metal, or combination thereof, and will be adapted for use in various catalytic systems, such as diesel oxidation catalysts, catalyzed soot filters, lean NOx traps, selective catalytic reduction catalysts, ammonia oxidation catalysts, or three-way catalysts. The invention also includes a system and method for heating a catalyst material, which includes a catalyst article that includes the catalyst composition and a conductor for receiving current and generating an alternating electromagnetic field in response thereto, the conductor positioned such that the generated alternating electromagnetic field is applied to at least a portion of the magnetic material.

6 Claims, 10 Drawing Sheets

Related U.S. Application Data continuation of application No. PCT/IB2017/052695, filed on May 9, 2017.

(60) Provisional application No. 62/334,811, filed on May 11, 2016.

(51) Int. Cl.

| | | |
|---|---|---|
| *B01D 53/94* | (2006.01) | |
| *B01J 21/04* | (2006.01) | |
| *B01J 21/08* | (2006.01) | |
| *B01J 21/12* | (2006.01) | |
| *B01J 23/83* | (2006.01) | |
| *B01J 23/89* | (2006.01) | |
| *B01J 29/76* | (2006.01) | |
| *B01J 35/00* | (2024.01) | |
| *B01J 35/04* | (2006.01) | |
| *B01J 35/33* | (2024.01) | |
| *B01J 35/45* | (2024.01) | |
| *F01N 3/20* | (2006.01) | |
| *F01N 3/28* | (2006.01) | |
| *B01J 35/56* | (2024.01) | |
| *B01J 37/04* | (2006.01) | |

(52) U.S. Cl.
CPC ..... *B01D 53/9422* (2013.01); *B01D 53/9436* (2013.01); *B01D 53/944* (2013.01); *B01D 53/945* (2013.01); *B01J 23/745* (2013.01); *B01J 23/83* (2013.01); *B01J 23/89* (2013.01); *B01J 23/894* (2013.01); *B01J 35/33* (2024.01); *B01J 35/45* (2024.01); *F01N 3/20* (2013.01); *F01N 3/2013* (2013.01); *F01N 3/2828* (2013.01); *B01D 2255/102* (2013.01); *B01D 2255/206* (2013.01); *B01D 2255/2068* (2013.01); *B01D 2255/20738* (2013.01); *B01D 2255/20746* (2013.01); *B01D 2255/209* (2013.01); *B01D 2255/50* (2013.01); *B01D 2255/91* (2013.01); *B01D 2255/9155* (2013.01); *B01D 2255/9202* (2013.01); *B01D 2257/404* (2013.01); *B01D 2257/406* (2013.01); *B01D 2257/502* (2013.01); *B01D 2257/702* (2013.01); *B01D 2257/708* (2013.01); *B01D 2258/012* (2013.01); *B01J 35/56* (2024.01); *B01J 37/04* (2013.01); *B01J 2523/00* (2013.01); *F01N 2330/06* (2013.01); *F01N 2370/04* (2013.01); *F01N 2510/063* (2013.01); *Y02T 10/12* (2013.01)

(58) Field of Classification Search
CPC ...... B01J 35/0033; B01J 21/04; B01J 21/063; B01J 21/066; B01J 21/08; B01J 21/12; F01N 3/20; F01N 3/2013; F01N 3/2828
See application file for complete search history.

(56) References Cited

U.S. PATENT DOCUMENTS

| | | | | |
|---|---|---|---|---|
| 9,242,239 | B2 * | 1/2016 | Fedeyko | B01J 37/0246 |
| 9,421,527 | B2 * | 8/2016 | Kim | B01J 21/18 |
| 9,555,405 | B2 * | 1/2017 | Wang | B01J 35/0013 |
| 9,579,604 | B2 * | 2/2017 | Hatfield | B01J 23/83 |
| 9,579,635 | B2 * | 2/2017 | Hoekstra | B01J 20/28057 |
| 9,849,421 | B2 * | 12/2017 | Chandler | B01J 23/002 |
| 2003/0232223 | A1 * | 12/2003 | Leddy | B03C 1/02 |
| | | | | 427/127 |
| 2007/0134145 | A1 * | 6/2007 | Strehlau | B01D 53/945 |
| | | | | 502/326 |
| 2010/0176068 | A1 * | 7/2010 | Dallas | C12M 25/14 |
| | | | | 210/500.21 |
| 2014/0131288 | A1 * | 5/2014 | Gu | B01J 23/72 |
| | | | | 427/127 |
| 2015/0290632 | A1 * | 10/2015 | Lambert | B01J 35/04 |
| | | | | 423/702 |
| 2015/0353840 | A1 * | 12/2015 | Hensley | C07C 29/1518 |
| | | | | 502/61 |
| 2016/0074833 | A1 * | 3/2016 | O'Brien | B01J 21/06 |
| | | | | 204/157.52 |
| 2016/0158734 | A1 * | 6/2016 | Shen | C07C 11/06 |
| | | | | 585/656 |
| 2016/0237958 | A1 * | 8/2016 | Mansour | F02M 27/02 |

* cited by examiner

CATALYST COMPOSITION COMPRISING MAGNETIC MATERIAL ADAPTED FOR INDUCTIVE HEATING

This application is a continuation of U.S. Non-Provisional application Ser. No. 16/184,162, filed Nov. 8, 2018, which is a continuation of International Application No. PCT/IB2017/052695, filed May 9, 2017, which International Application was published by the International Bureau in English on Nov. 16, 2017, and claims priority to U.S. Provisional Application No. 62/334,811, filed on May 11, 2016, the contents of which are incorporated by reference in their entirety and for all purposes.

FIELD OF THE INVENTION

The present invention relates to catalyst compositions for use in treating engine effluent, methods for the preparation and use of such catalyst compositions, and catalyst articles and systems employing such catalyst compositions.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Catalysts containing platinum group metals (PGM) are useful in treating the exhaust of diesel engines to convert hydrocarbon and carbon monoxide by catalyzing the oxidation of these pollutants to carbon dioxide and water. In addition, oxidation catalysts that contain platinum promote the oxidation of NO to $NO_2$. For heavy-duty diesel systems, such catalysts are generally contained within regeneration diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, diesel oxidation catalysts are deposited on ceramic or metallic substrates. For additional reduction of NOx species, such systems also typically include an at least one Selective Catalytic Reduction (SCR) catalyst downstream from the DOC catalyst. In light and medium-duty applications, the system may contain a lean $NO_x$ trap (LNT) which serves to store and reduce $NO_x$, as well as remove carbon monoxide and unburned hydrocarbons from the exhaust stream.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion to occur. This is particularly true for the downstream catalyst components, such as an SCR catalyst, which can take several minutes to reach a suitable operating temperature.

Use of electric heating of a catalyst article during start-up conditions has been suggested. See, for example, U.S. Pat. Publ. Nos. US2011/0072805; US2014/0033688, and US2015/0087497, as well as U.S. Pat. Nos. 8,292,987 and 8,479,496. In a typical approach, the heat is generated by the electric heater, e.g., electric wires wrapped outside the catalyst substrate or a metallic substrate itself serving as the heating element. Several challenges to successful commercialization of such systems exist, including the relatively high energy consumption required and the relatively low heating efficiency due to the need to first heat the catalyst substrate. In addition, most electric heating designs in the art use metallic substrates and are not compatible with the more widely-adopted ceramic substrates used as a catalyst carrier in many systems.

There is a continuing need in the art to reduce tailpipe emissions of gaseous pollutants from gasoline or diesel engines, particularly breakthrough emissions that occur during cold start of the engine.

SUMMARY OF THE INVENTION

The invention provides a catalyst composition comprising a mixture of catalytically active particles and a magnetic material capable of inductive heating in response to an applied alternating electromagnetic field. The invention can be used to provide heating of a catalyst layer to improve efficiency of catalytic activity, particularly at times in which conventional catalyst systems require several minutes to reach an operating temperature conducive to catalytic activity, such as during cold-start of an engine. Exemplary magnetic materials include ferromagnetic and paramagnetic materials. Although the form of the magnetic material can vary, in certain embodiments, the magnetic material is in a particulate form that is readily dispersible within a catalyst composition, and particularly including nanoparticle magnetic materials classified as superparamagnetic materials.

Although any material capable of inductive heating in the presence of an alternating electromagnetic field can be used, advantageous magnetic materials include materials comprising a transition metal or a rare earth metal, particularly oxides comprising such transition metals or rare earth metals. In certain embodiments, the magnetic material comprises superparamagnetic iron oxide nanoparticles or rare earth containing particulate materials comprising neodymium-iron-boron or samarium-cobalt particles.

The catalytically active particles of the catalyst composition can vary without departing from the invention, such as any catalytically active materials commonly employed in emission control systems for gasoline or diesel engines. For example, the catalytically active particles can be part of a composition adapted for one or more of oxidation of carbon monoxide, oxidation of hydrocarbons, oxidation of NOx, oxidation of ammonia, selective catalytic reduction of NOx, and NOx storage/reduction. Such catalyst materials will typically include one or more catalytic metals impregnated or ion-exchanged in a porous support, with exemplary supports including refractory metal oxides and molecular sieves. In certain embodiments, the catalytic metal is selected from base metals, platinum group metals, oxides of base metals or platinum group metals, and combinations thereof. Types of catalyst systems in which the catalyst composition of the invention can be used include diesel oxidation catalysts (DOC), catalyzed soot filters (CSF), lean NOx traps (LNT), selective catalytic reduction (SCR) catalysts, ammonia oxidation (AMOx) catalysts, and three-way catalysts (TWC). Additional examples include catalytically active particles adapted for use as a volatile organic hydrocarbon (VOC) oxidation catalyst or a room temperature hydrocarbon oxidation catalyst.

In another aspect, the invention provides a system adapted for heating a catalyst material, comprising: a catalyst article in the form of a substrate comprising a plurality of channels adapted for gas flow and a catalyst layer adhered to each channel, the catalyst layer comprising a catalytically active material with a magnetic material (e.g., superparamagnetic material) dispersed therein, the magnetic material capable of inductive heating in response to an applied alternating electromagnetic field; and a conductor for receiving current and generating an alternating electromagnetic field in response thereto, the conductor positioned such that the generated alternating electromagnetic field is applied to at least a portion of the magnetic material. The conductor can be, for example, in the form of a coil of conductive wire surrounding at least a portion of the catalyst article. The system can further include an electric power source electrically connected to the conductor for supplying alternating current thereto. The substrate can be, for example, a flow-through substrate or a wall flow filter. Still further, the system can include a temperature sensor positioned to measure the temperature of gases entering the catalyst article and a controller in communication with the temperature sensor, the controller adapted for control of the current received by the conductor such that the controller can energize the conductor with current when inductive heating of the catalyst layer is desired.

In yet another aspect, the invention provides a method of treating emissions from an internal combustion engine, comprising: producing an exhaust gas in an internal combustion engine; treating the exhaust gas in an emission control system, the emission control system comprising a catalyst article and conductor as described herein; and intermittently energizing the conductor by passing current therethrough to generate an alternating electromagnetic field and inductively heat the magnetic material in order to heat the catalyst layer to a desired temperature.

The invention includes, without limitation, the following embodiments.

Embodiment 1: A catalyst composition, comprising a mixture of catalytically active particles and a magnetic material capable of inductive heating in response to an applied alternating electromagnetic field.

Embodiment 2: The catalyst composition of any preceding or subsequent embodiment, wherein the magnetic material is superparamagnetic.

Embodiment 3: The catalyst composition of any preceding or subsequent embodiment, wherein the magnetic material is in particulate form.

Embodiment 4: The catalyst composition of any preceding or subsequent embodiment, wherein the magnetic material is in nanoparticle form.

Embodiment 5: The catalyst composition of any preceding or subsequent embodiment, wherein the magnetic material comprises a transition metal or a rare earth metal.

Embodiment 6: The catalyst composition of any preceding or subsequent embodiment, wherein the magnetic material comprises superparamagnetic iron oxide nanoparticles.

Embodiment 7: The catalyst composition of any preceding or subsequent embodiment, wherein the magnetic material comprises a rare earth containing particulate material comprising neodymium-iron-boron or samarium-cobalt particles.

Embodiment 8: The catalyst composition of any preceding or subsequent embodiment, wherein the catalytically active particles are adapted for one or more of oxidation of carbon monoxide, oxidation of hydrocarbons, oxidation of NOx, oxidation of ammonia, selective catalytic reduction of NOx, and NOx storage/reduction.

Embodiment 9: The catalyst composition of any preceding or subsequent embodiment, wherein the catalytically active particles comprise one or more catalytic metals impregnated or ion-exchanged in a porous support.

Embodiment 10: The catalyst composition of any preceding or subsequent embodiment, wherein the porous support is a refractory metal oxide or a molecular sieve.

Embodiment 11: The catalyst composition of any preceding or subsequent embodiment, wherein the one or more catalytic metals are selected from base metals, platinum group metals, oxides of base metals or platinum group metals, and combinations thereof.

Embodiment 12: The catalyst composition of any preceding or subsequent embodiment, wherein the catalytically active particles are adapted for use as a diesel oxidation catalyst (DOC), a catalyzed soot filter (CSF), a lean NOx trap (LNT), a selective catalytic reduction (SCR) catalyst, an ammonia oxidation (AMOx) catalyst, or a three-way catalyst (TWC).

Embodiment 13: The catalyst composition of any preceding or subsequent embodiment, wherein the catalytically active particles are adapted for use as a volatile organic hydrocarbon (VOC) oxidation catalyst or a room temperature hydrocarbon oxidation catalyst.

Embodiment 14: A system adapted for heating a catalyst material, comprising:
a catalyst article in the form of a substrate comprising a plurality of channels adapted for gas flow and a catalyst layer adhered to each channel, the catalyst layer comprising a catalyst composition according to any preceding or subsequent embodiment; and
a conductor for receiving current and generating an alternating electromagnetic field in response thereto, the conductor positioned such that the generated alternating electromagnetic field is applied to at least a portion of the magnetic material.

Embodiment 15: The system of any preceding or subsequent embodiment, wherein the conductor is in the form of a coil of conductive wire surrounding at least a portion of the catalyst article.

Embodiment 16: The system of any preceding or subsequent embodiment, further comprising an electric power source electrically connected to the conductor for supplying alternating current thereto.

Embodiment 17: The system of any preceding or subsequent embodiment, wherein the substrate is a flow-through substrate or a wall flow filter.

Embodiment 18: The system of any preceding or subsequent embodiment, further comprising a temperature sensor positioned to measure the temperature of gases entering the catalyst article and a controller in communication with the temperature sensor, the controller adapted for control of the current received by the conductor such that the controller can energize the conductor with current when inductive heating of the catalyst layer is desired.

Embodiment 19: A method of treating emissions from an internal combustion engine, comprising:
producing an exhaust gas in an internal combustion engine;
treating the exhaust gas in an emission control system, the emission control system comprising a catalyst article in the form of a substrate comprising a plurality of channels adapted for gas flow and a catalyst layer adhered to each channel, the catalyst layer comprising a catalyst composition according to any preceding or subsequent embodiment; and a conductor for receiving current and generating an alternating electromagnetic field in response thereto, the conductor positioned such that the generated alternating electromagnetic field is applied to at least a portion of the magnetic material; and
intermittently energizing the conductor by passing current therethrough to generate an alternating electromagnetic field and inductively heat the magnetic material in order to heat the catalyst layer to a desired temperature.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

The present invention now will be described more fully hereinafter. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents. It is to be understood that the invention is not limited to the details of construction or process steps set forth in the following description. The invention is capable of other embodiments and of being practiced or being carried out in various ways. Like numbers refer to like elements throughout. As used in this specification and the claims, the singular forms "a," "an," and "the" include plural referents unless the context clearly dictates otherwise.

The invention provides a catalyst composition comprising a mixture of catalytically active particles and a magnetic material (e.g., a superparamagnetic material) capable of inductive heating in response to an applied alternating electromagnetic field. The use of inductive heating of a magnetic material dispersed within or otherwise in intimate contact with the catalyst material is an efficient means to direct heat to the catalyst material and is particularly advantageous at times in which a catalyst system needs to reach an operating temperature conducive to catalytic activity in a short period of time, such as during cold-start of an engine. By enabling a catalyst material to reach a desired temperature more quickly, undesirable gaseous pollutant breakthrough normally associated with operation of the catalyst at low temperature can be minimized. Exemplary magnetic materials include ferromagnetic and paramagnetic materials. Although the form of the magnetic material can vary, in certain embodiments, the magnetic material is in a particulate form that is readily dispersible within a catalyst composition, and particularly including nanoparticle magnetic materials denoted as superparamagnetic materials. However, the magnetic material, in certain embodiments, can be used in the form of nanowires, nanotubes, or in the form of a sheet so long as the magnetic material is in intimate contact with the catalyst material.

Although any material capable of inductive heating in the presence of an alternating electromagnetic field can be used, advantageous magnetic materials include materials comprising a transition metal or a rare earth metal, particularly oxides comprising such transition metals or rare earth metals. "Rare earth metal" refers to scandium, yttrium, and the lanthanum series, as defined in the Periodic Table of Elements, or oxides thereof. Examples of rare earth metals include lanthanum, tungsten, cerium, neodymium, gadolinium, yttrium, praseodymium, samarium, hafnium, and mixtures thereof. Examples of transition metals that could be used as a component of the magnetic materials include iron, nickel, and cobalt. Mixtures of transition metals and rare earth metals can be used in the same magnetic material.

The oxide forms of many magnetic metals are particularly advantageous for use in the present invention, as metal oxides tend to be highly stable at the operating temperatures often associated with catalyst systems used to treat emissions from engines. In certain embodiments, the magnetic material comprises superparamagnetic iron oxide nanoparticles (SPION particles) or rare earth containing particulate materials comprising neodymium-iron-boron or samarium-cobalt particles. In one embodiment, the magnetic material comprises SPION particles (e.g., iron (III) oxide particles) having an average particle size of less than about 100 nm, such as about 5 to about 50 nm or about 10 to about 40 nm.

The magnetic material can be combined with the catalyst material in various ways. In certain embodiments, the magnetic material is admixed with the catalyst material prior to coating a substrate. For example, the magnetic material could be added to a washcoat slurry and dispersed within the catalyst material manner prior to coating. Alternatively, the magnetic material itself could serve as a support material for a catalytically active metal, meaning a catalytically active metal of the type generally described herein (e.g., PGM or base metals) could be added as a surface coating on the magnetic material using various processes, such as impregnation or spray drying. The magnetic material can also be embedded into honeycomb monolith substrate wall, or coated as a separate layer serving as the top or bottom support for catalytically active components.

Catalyst Material

The catalytically active particles of the catalyst composition can vary without departing from the invention, and include any catalytically active materials commonly employed in emission control systems of gasoline or diesel engines. For example, the catalytically active particles can be a part of a composition adapted for one or more of oxidation of carbon monoxide, oxidation of hydrocarbons, oxidation of NOx, oxidation of ammonia, and selective catalytic reduction of NOx.

Such catalyst materials will typically include one or more catalytic metals impregnated or ion-exchanged in a porous support, with exemplary supports including refractory metal oxides and molecular sieves. In certain embodiments, the catalytic metal is selected from base metals, platinum group metals, oxides of base metals or platinum group metals, and combinations thereof. Types of catalyst systems in which the catalyst composition of the invention can be used include diesel oxidation catalysts (DOC), catalyzed soot filters (CSF), lean NOx traps (LNT), selective catalytic reduction (SCR) catalysts, ammonia oxidation (AMOx) catalysts, and three-way catalysts (TWC). Additional examples include catalytically active particles adapted for use as a volatile organic hydrocarbon (VOC) oxidation catalyst or a room temperature hydrocarbon oxidation catalyst.

As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In certain embodiments, the platinum group metal comprises a combination of platinum and palladium, such as in a weight ratio of about 1:10 to about 10:1. The concentrations of PGM component (e.g., Pt, Pd or a combination thereof) can vary, but will typically be from about 0.1 wt. % to about 10 wt. % relative to the weight of the porous support such as a refractory oxide support material (e.g., about 1 wt. % to about 6 wt. % relative to the refractory oxide support).

As used herein, "base metal" refers to a transition metal or lanthanide (e.g., V, Mn, Fe, Co, Ni, Cu, Zn, Ag, Au, or Sn) or oxide thereof that is catalytically active for oxidation of CO, NO, or HC, or promotes another catalytic component to be more active for oxidation of CO, NO, or HC, and particularly includes copper, manganese, cobalt, iron, chromium, nickel, cerium, and combinations thereof. For ease of reference herein, concentrations of base metal or base metal oxide materials are reported in terms of elemental metal concentration rather than the oxide form. The total concentration of base metal in the base metal oxide component (e.g., copper, manganese, nickel, cobalt, iron, cerium, praseodymium, and combinations thereof) can vary, but will typically be from about 1 wt. % to 50 wt. % relative to the weight of the porous support such as refractory oxide support material (e.g., about 10 wt. % to about 50 wt. % relative to the refractory oxide support).

As used herein, "porous refractory oxide" refers to porous metal-containing oxide materials exhibiting chemical and physical stability at high temperatures (e.g., about 800° C.), such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 $m^2/g$, often up to about 200 $m^2/g$ or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 to 350 $m^2/g$, and typically 90 to 250 $m^2/g$.

As used herein, the term "molecular sieves" refers to zeolites and other zeolitic framework materials (e.g. isomorphously substituted materials), which may, in particulate form, support catalytic metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that by defining the molecular sieves by their structure type, it is intended to include the structure type and any and all isotypic framework materials such as silico-alumino-phosphate (SAPO), alumino-phosphate (ALPO) and metal-alumino-phosphate (MeAPO) materials having the same structure type, as well as borosilicates, gallosilicates, mesoporous silica materials such as SBA-15 or MCM-41, and the like.

In certain embodiments, the molecular sieve may comprise a zeolite or zeotype selected from the group consisting of a chabazite, ferrierite, clinoptilolite, silico-alumino-phosphate (SAPO), beta-zeolite, Y-zeolite, mordenite, faujasite, ZSM-5, mesoporous materials, and combinations thereof. The zeolite may be ion-exchanged with a metal, such as a metal selected from the group consisting of La, Ba, Sr, Mg, Pt, Pd, Ag, Cu, V, Ni, Co, Fe, Zn, Mn, Ce, and combinations thereof.

Preparation of the metal ion-exchanged molecular sieve typically comprises an ion-exchange process of the molecular sieve in particulate form with a metal precursor solution. For example, metal ion-exchanged molecular sieves have previously been prepared using ion-exchange techniques described in U.S. Pat. No. 9,138,732 to Bull et al. and U.S. Pat. No. 8,715,618 to Trukhan et al., which are incorporated by reference therein in their entireties.

The ratio of silica to alumina in molecular sieves useful as SCR catalytic materials can vary over a wide range. In one or more embodiments, molecular sieves useful as SCR catalytic materials have a silica to alumina molar ratio (SAR) in the range of 2 to 300, including 5 to 250; 5 to 200; 5 to 100; and 5 to 50.

Metal-promoted zeolite catalysts including, among others, iron-promoted and copper-promoted zeolite catalysts, for the selective catalytic reduction of nitrogen oxides with ammonia are particularly advantageous. The promoter metal content in such catalysts, calculated as the oxide, is, in one or more embodiments, at least about 0.1 wt. %, reported on a volatile-free basis. In specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, in each case based on the total weight of the calcined zeolite component reported on a volatile free basis. In specific embodiments, the Cu content, calculated as CuO, is in the range of about 1 to about 6 wt. %.

The catalytic material used in the invention can be described based on function and type, as well as materials of construction as noted above. For example, the catalyst material can be a diesel oxidation catalyst (DOC), a catalyzed soot filter (CSF), a lean NOx trap (LNT), a selective catalytic reduction (SCR) catalyst, or a three-way catalyst (TWC).

A DOC or CSF catalyst typically comprises one or more PGM components impregnated on a metal oxide support such as alumina, optionally further including an oxygen storage component (OSC) such as ceria, and typically provides oxidation of both hydrocarbons and carbon monoxide.

An LNT catalyst generally contains one or more PGM components impregnated on a support and NOx trapping components (e.g., ceria and/or alkaline earth metal oxides). An LNT catalyst is capable of adsorbing NOx under lean conditions and reducing the stored NOx to nitrogen under rich conditions.

An SCR catalyst is adapted for catalytic reduction of nitrogen oxides with a reductant in the presence of an appropriate amount of oxygen. Reductants may be, for example, hydrocarbon, hydrogen, and/or ammonia. SCR catalysts typically comprise a molecular sieve (e.g., a zeolite) ion-exchanged with a promoter metal such as copper or iron, with exemplary SCR catalysts including FeCHA and CuCHA.

A TWC catalyst refers to the function of three-way conversion where hydrocarbons, carbon monoxide, and nitrogen oxides are substantially simultaneously converted. Typically, a TWC catalyst comprises one or more platinum group metals such as palladium and/or rhodium and optionally platinum, and an oxygen storage component. Under rich conditions, TWC catalysts typically generate ammonia.

An AMOx catalyst refers to an ammonia oxidation catalyst, which is a catalyst containing one or more metals suitable to convert ammonia, and which is generally supported on a support material such as alumina. An exemplary AMOx catalyst comprises a copper zeolite in conjunction with a supported platinum group metal (e.g., platinum impregnated on alumina).

Method of Making Catalyst Composition

Preparation of a porous support with a PGM or base metal component typically comprises impregnating the porous support (e.g., a refractory oxide support material in particulate form such as particulate alumina) with a PGM or base metal solution. Multiple metal components (e.g., platinum and palladium) can be impregnated at the same time or separately, and can be impregnated on the same support particles or separate support particles using an incipient wetness technique. The support particles are typically dry enough to absorb substantially all of the solution to form a moist solid. Aqueous solutions of water soluble compounds or complexes of the metal component are typically utilized, such as palladium or platinum nitrate, tetraammine palladium or platinum nitrate, tetraammine palladium or platinum acetate, copper (II) nitrate, manganese (II) nitrate, and ceric ammonium nitrate. Following treatment of the support particles with the metal solution, the particles are dried, such as by heat treating the particles at elevated temperature (e.g., 100-150° C.) for a period of time (e.g., 1-3 hours), and then calcining to convert the metal components to a more catalytically active form. An exemplary calcination process involves heat treatment in air at a temperature of about 400-550° C. for 1-3 hours. The above process can be repeated as needed to reach the desired level of impregnation. The resulting material can be stored as a dry powder or in slurry form.

Preparation of a metal ion-exchanged molecular sieve typically comprises an ion-exchange process of the molecular sieve in particulate form with a metal precursor solution. Multiple metal precursors can be ion-exchanged at the same time or separately, can use the same external solution or separate external solutions, and are ion-exchanged on the same or different support particles.

During the ion exchange process, ions with weaker bonding strengths and residing in a porous support, e.g., zeolite, are exchanged with an outside metal ion of interest. For example, zeolites prepared with sodium ions residing in the pores can be exchanged with a different ion to form an ion-exchanged porous support. This is accomplished by preparing a slurry of the porous support in a solution containing the outside metal ion of interest to be exchanged.

Heat may be optionally applied during this process. The outside metal ion can now diffuse into the pores of the support and exchange with the residing ion, i.e., sodium, to form the metal-ion exchanged porous support.

For example, in certain embodiments, metal ion-exchanged molecular sieves have been prepared using ion-exchange techniques described in U.S. Pat. No. 9,138,732 to Bull et al and U.S. Pat. No. 8,715,618 to Trukhan et al., which are incorporated by reference therein in their entireties. These ion-exchange processes describe the preparation of a copper ion-exchanged CHA zeolite catalyst.

Substrate

According to one or more embodiments, the substrate for the catalyst composition may be constructed of any material typically used for preparing automotive catalysts and will typically comprise a metal or ceramic honeycomb structure. The substrate typically provides a plurality of wall surfaces upon which the catalyst composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 40-70%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition associated therewith (e.g., a CSF composition) can permeate into the pore structure of the porous walls (i.e., partially or fully occluding the pore openings) in addition to being disposed on the surface of the walls.

Figure 1A:
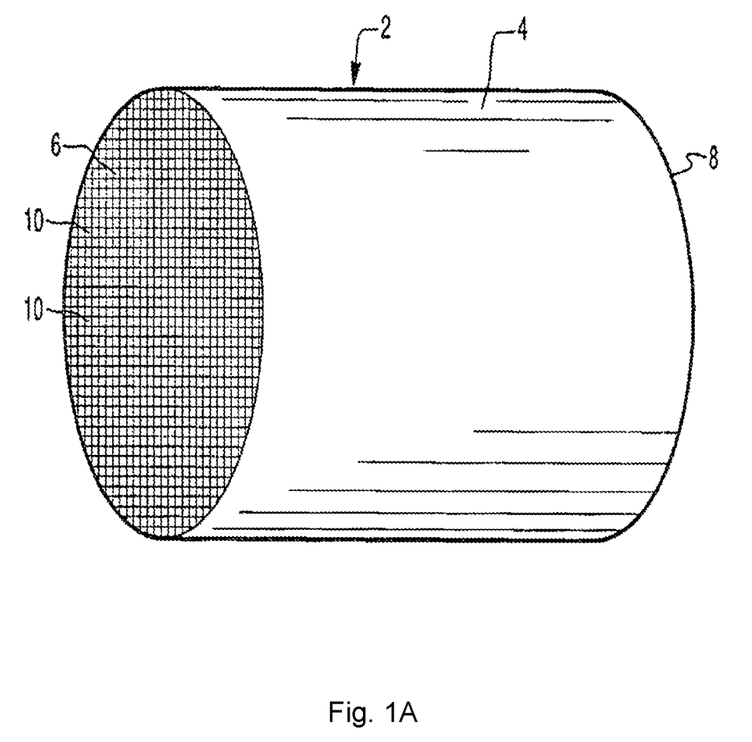
FIG. 1A is a perspective view of a honeycomb-type substrate which may comprise a catalyst composition in accordance with the present invention.
Figure 1B:
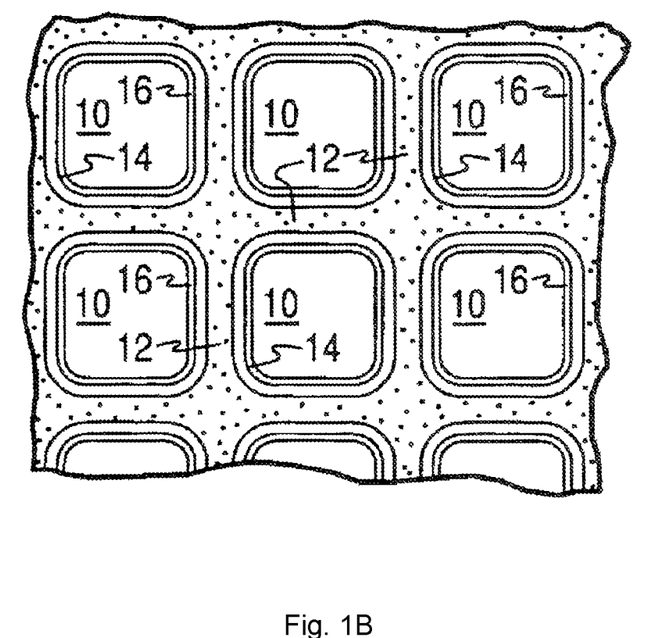
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

FIGS. 1A and 1B illustrate an exemplary substrate 2 in the form of a flow-through substrate coated with a washcoat composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 1B.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the catalyst composition (including catalytic metal and support material) on the catalyst substrate, such as a monolithic flow-through substrate, is typically from about 0.5 to about 6 g/in$^3$, and more typically from about 1 to about 5 g/in$^3$. Total loading of the PGM or base metal component without support material is typically in the range of about 5 to about 200 g/ft$^3$ (e.g., 10 to about 100 g/ft$^3$). It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Substrate Coating Process

The catalyst composition can be used in the form of a packed bed of powder, beads, or extruded granules. However, in certain advantageous embodiments, the catalyst composition is coated on a substrate. The catalyst composition can be mixed with water (if in dried form) to form a slurry for purposes of coating a catalyst substrate. In addition to the catalyst particles, the slurry may optionally contain alumina as a binder, associative thickeners, and/or surfactants (including anionic, cationic, non-ionic or amphoteric surfactants). In some embodiments, the pH of the slurry can be adjusted, e.g., to an acidic pH of about 3 to about 5.

When present, an alumina binder is typically used in an amount of about 0.02 $g/in^3$ to about 0.5 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 10 to about 50 microns (e.g., about 10 to about 20 microns). The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a material applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

In one embodiment, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers. A catalyst layer resulting from repeated washcoating of the same catalyst material to build up the loading level is typically viewed as a single layer of catalyst. In another embodiment, the catalyst composition is applied in multiple layers with each layer having a different composition. Additionally, the catalyst composition can be zone-coated, meaning a single substrate can be coated with different catalyst compositions in different areas along the gas effluent flow path.

The magnetic material can be added to the catalyst composition prior to coating the substrate. For example, particulate magnetic materials are conveniently added to the washcoat slurry, preferably prior to the milling step such that the milling action will enhance dispersion of the magnetic material throughout the slurry.

Emission Treatment System

The present invention also provides an emission treatment system that incorporates the catalyst composition or article described herein. The catalyst composition of the present invention is typically used in an integrated emissions treatment system comprising one or more additional components for the treatment of gasoline or diesel exhaust gas emissions. As such, the terms "exhaust stream", "engine exhaust stream", "exhaust gas stream" and the like refer to the engine effluent as well as to the effluent downstream of one or more other catalyst system components as described herein.

Figure 2:
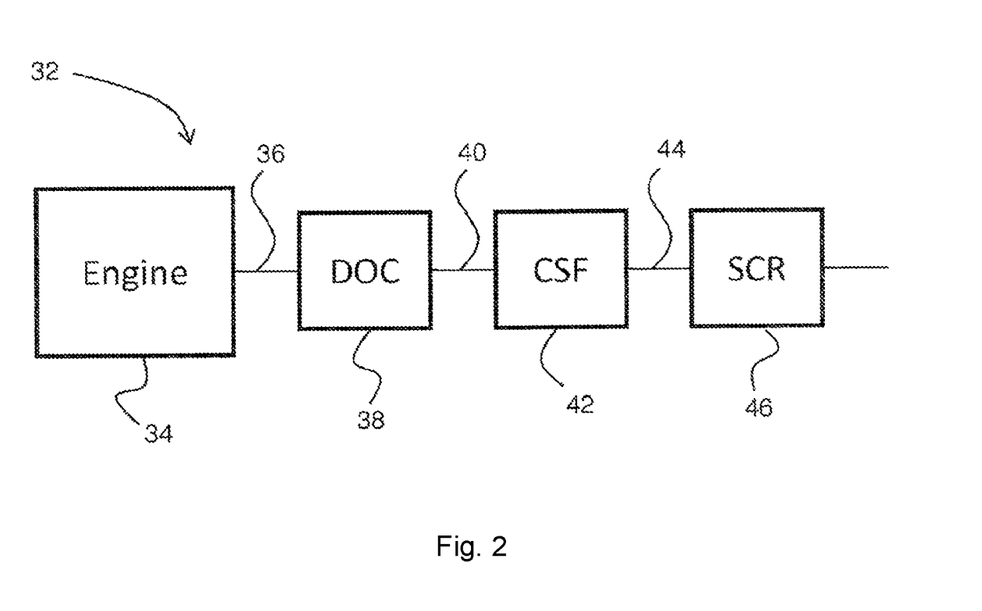
FIG. 2 shows a schematic depiction of an embodiment of an emission treatment system in which a catalyst composition of the present invention is utilized.
Figure 3:
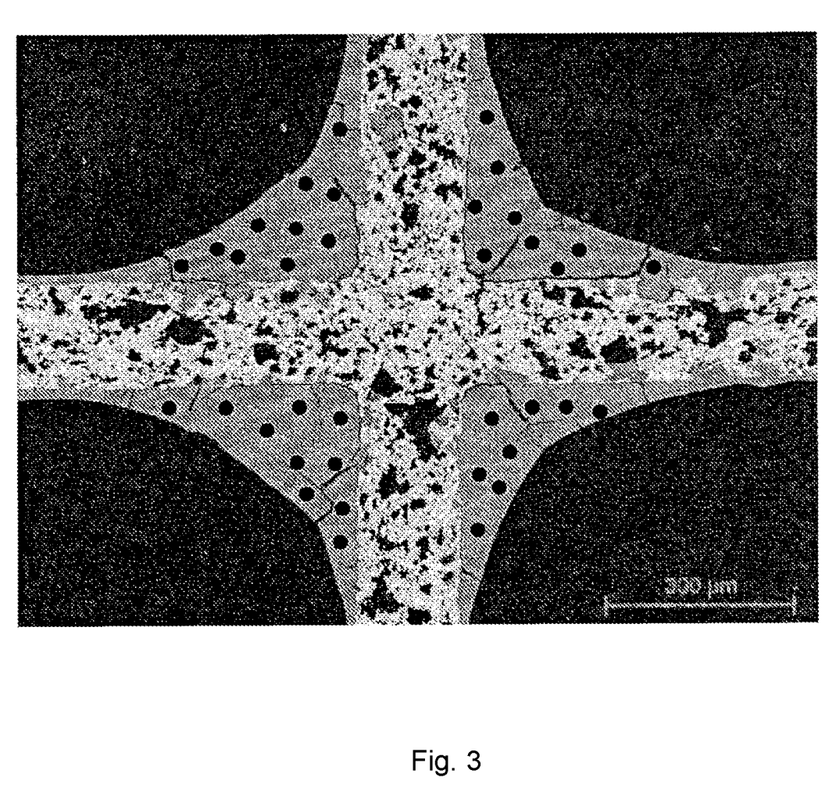
FIG. 3 is an SEM image of an exemplary catalyst composition layer with a representation of magnetic particles superimposed on the image to illustrate dispersion of such particles in the catalyst composition.

One exemplary emissions treatment system is illustrated in FIG. 2, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC. The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. After removal of particulate matter, via CSF 42, the exhaust gas stream is conveyed via exhaust pipe 44 to a downstream selective catalytic reduction (SCR) component 16 for the further treatment and/or conversion of $NO_x$. Note that any or all of the above-noted catalyst components, or other optional catalyst components, could include the catalyst composition of the invention including the magnetic material.

Figure 4:
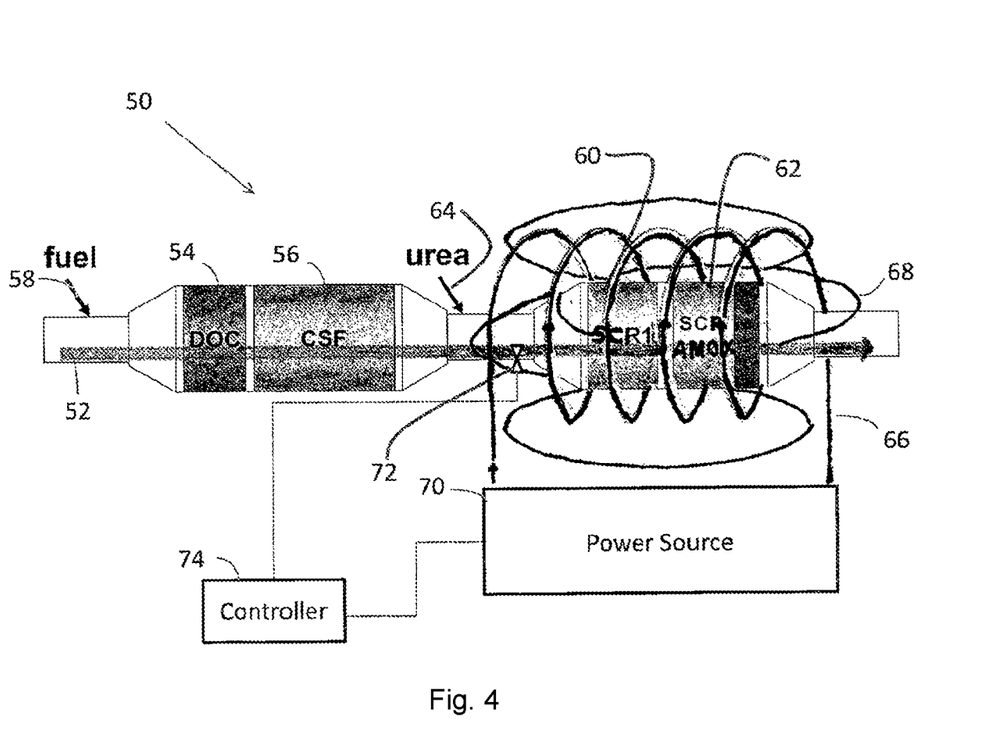
FIG. 4 is a schematic depiction of an embodiment of an emission treatment system in which a catalyst composition of the present invention is utilized, and which illustrates the electrical conductor, controller, power source, and temperature sensor.

FIG. 4 provides another schematic view of an exemplary emission treatment system 50, wherein arrow 52 shows the direction of travel of an engine effluent. As shown, the system 50 includes a DOC catalyst 54 adjacent to a CSF 56, with an upstream fuel addition port 58 adapted for regeneration of the CSF at desired intervals. The system 50 further includes a downstream SCR catalyst 60 with an optional additional SCR catalyst and/or AMOx catalyst 62 adjacent thereto, and a urea injection port 64 upstream of the SCR catalyst adapted to introduce ammonia into the system for purposes of the SCR reaction. In the illustrated embodiment, one or both of the SCR catalyst 60 and the optional SCR/AMOx catalyst 62 include a magnetic material as described herein. An electric coil 66 surrounds the SCR catalyst 60 and optional second SCR/AMOx catalyst 62 in order to provide an alternating magnetic field 68 adapted for inductive heating of the magnetic material. The electric coil 66 is electrically connected to a power source 70 capable of providing alternating electric current to the coil, with output power typically in the range of about 5 to 50 kW and at a frequency of about 100-10000 kHz. Note that the illustrated embodiment is merely one example of the invention. In alternative embodiments, the coil 66 could be placed in other locations such as also surrounding the DOC catalyst 54 or other catalyst components of the system.

The system 50 further includes an optional temperature sensor 72 positioned to measure the temperature of engine effluent gases entering the SCR catalyst 60. Both the power source 70 and the temperature sensor 72 are operatively connected to a controller 74, which is configured to control the power source and receive the temperature signals from the sensor. As would be understood, the controller 74 can comprises hardware and associated software adapted to allow the controller to provide instructions to the power source to energize the electric coil 66 at any time when inductive heating of the magnetic material is desired. The controller can select the time period for inductive heating based on a variety of factors, such as based on a particular temperature set point associated with the temperature sensor 72, at specific time period based on ignition of the engine (e.g. a control system adapted to inductively heat the magnetic material for a set time period following engine ignition), or at specific preset time intervals.

Although FIG. 4 illustrates the inductive heating components as associated with a downstream SCR catalyst, the invention is not limited to such embodiments. The magnetic material set forth herein can be added to any catalyst composition for which inductive heating would be useful to maintain the catalyst composition in an optimal temperature range for catalytic activity. The desired temperature range will vary depending on the catalyst type and function, but will typically be in the range of about 100° C. to 450° C., more preferably about 150° C. to 350° C. In terms of specific, illustrative examples, an SCR catalyst will typically need to be heated to at least about 150° C. to promote useful SCR activity; a DOC catalyst will typically need to be heated to at least about 120° C. for useful CO oxidation; and an LNT typically needs to be heated to at least about 200° C. for useful NOx storage and at least about 300° C. for useful regeneration/NOx reduction.

EXPERIMENTAL

Aspects of the present invention are more fully illustrated by the following examples, which are set forth to illustrate certain aspects of the present invention and are not to be construed as limiting thereof.

Figure 5:
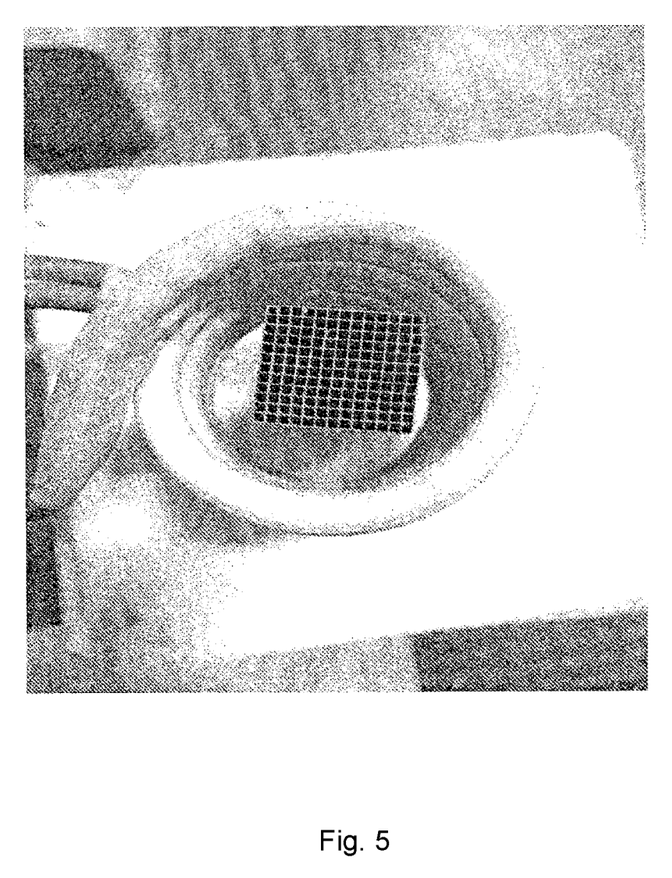
FIG. 5 is a top view of the experimental arrangement described in the Experimental section herein, showing a substrate having a catalyst composition coated therein arranged within an insulated electric coil.
Figure 6A:
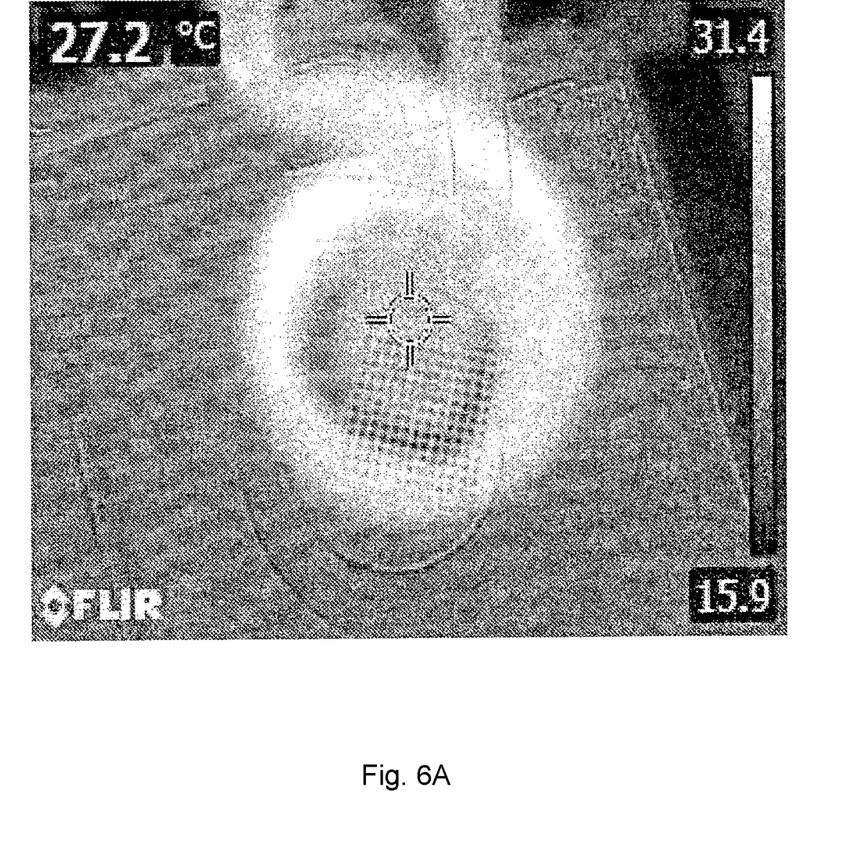
FIGS. 6A and 6B are top views of the same general experimental arrangement set forth in FIG. 5, wherein (A) shows the internal temperature of a coated catalyst article comprising superparamagnetic iron oxide nanoparticles (SPION) dispersed in a catalyst composition after 30 seconds of current through the surrounding coil, and (B) shows the internal temperature of a comparative coated catalyst article containing no superparamagnetic iron oxide nanoparticles (SPION) after 30 seconds of current through the surrounding coil.
Figure 6B:
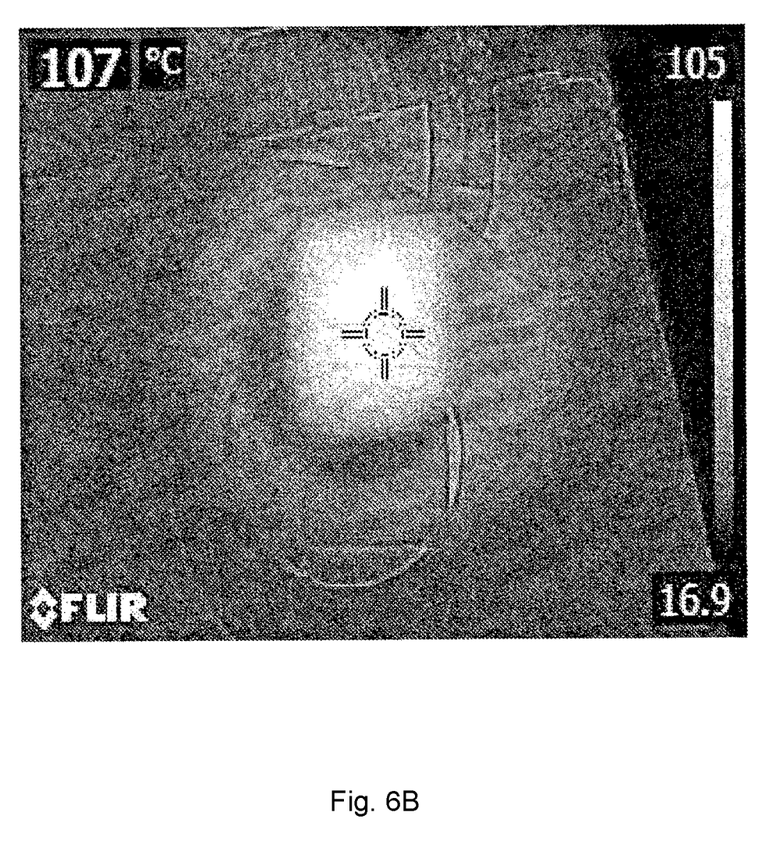
Figure 7:
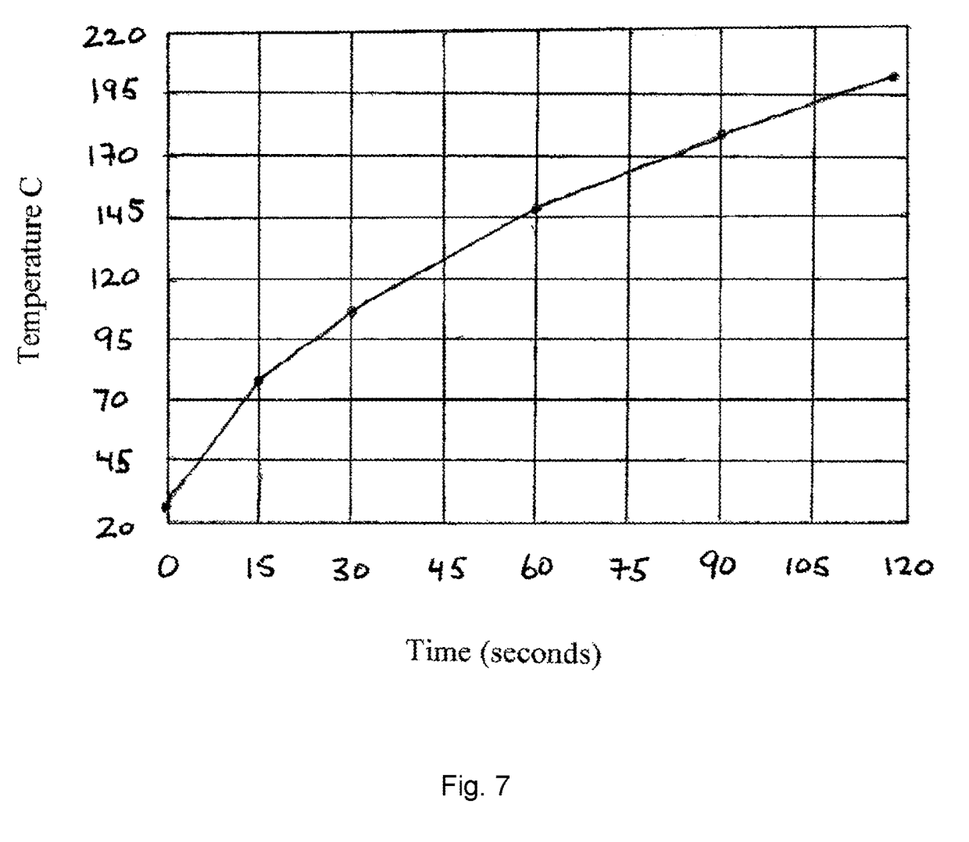
FIG. 7 graphically illustrates the rise in temperature in an inductively-heated coated catalyst article.
Figure 8:
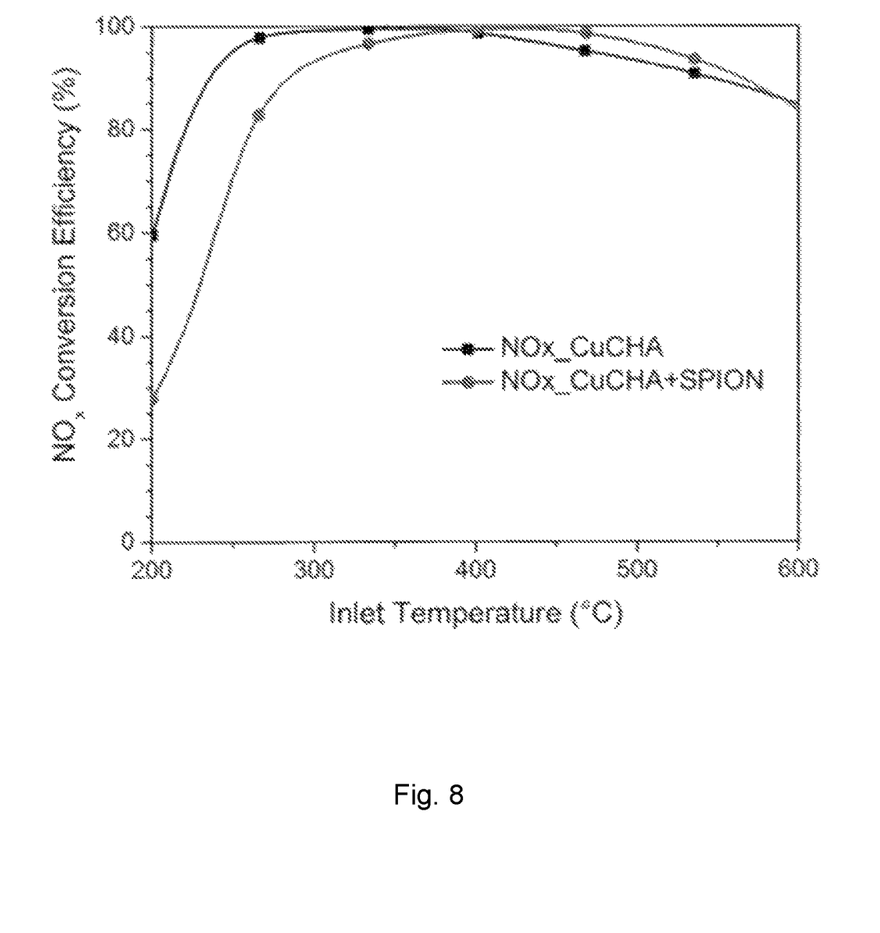
FIG. 8 graphically illustrate the catalyst performance of a comparative coated CuCHA catalyst article containing no superparamagnetic iron oxide nanoparticles (SPION) and a CuCHA coated catalyst article comprising superparamagnetic iron oxide nanoparticles (SPION) dispersed in a catalyst composition.

A ceramic honeycomb flow-through substrate having a height of about 70 mm and a width of about 25 mm (wall thickness of 0.1 mm) was washcoated with a copper-exchanged chabazite (CuCHA) admixed with SPION particles (1:1 weight ratio of CuCHA to SPION particles) having an average particle size in the range of 20-40 nm. The total catalyst/SPION loading on the substrate was about 2.0 g/in$^3$. For comparative purposes, a second ceramic honeycomb substrate of identical dimensions is washcoated with 1.0 g/in$^3$ of CuCHA. Both substrates were placed within an insulated electric coil associated with a 10 KW high frequency induction heater with an output frequency of 100-500 KHz. A top view of the experimental set-up showing the substrate within the coil is shown in FIG. 5. The coil surrounded approximately the top three-quarters of the substrate. The electric coil was energized and the temperature of the substrate was measured using a thermal imaging camera with an IR resolution of 10,800 pixels, a temperature range of 20-250° C., and a measurement accuracy of +/−2° C. Temperature of each substrate was measured over time. FIG. 6 illustrates the difference in temperature between the two substrates at the 30 second mark. As can be seen in FIG. 6A, the substrate coated with the catalyst composition that includes the SPION particles has reached a temperature of over 100° C., while the comparative substrate with no SPION particles shown in FIG. 6B remains much cooler (about 27° C.) and essentially no warmer than the surrounding coil based on the image intensity from the thermal imaging camera. The complete plot of the temperature profile for the substrate coated with SPION particles is shown in FIG. 7, which shows that the substrate temperature reached 200° C. in about 120 seconds. FIG. 8 shows the SCR performance for each catalyst article. This comparative study illustrates that the presence of a superparamagnetic material in a catalyst composition can effectively heat a catalyst article using an inductive heating system. Meanwhile, the SPION-containing Cu-CHA catalyst article shows tolerable 200° C. SCR performance loss, which is likely due to dilution effects.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed:

1. A catalyst composition, comprising catalytically active particles and a magnetic material, wherein:
    the catalytically active particles comprise one or more catalytic metals impregnated or ion-exchanged in a porous support, wherein the porous support is a refractory metal oxide or a molecular sieve, and the one or more catalytic metals are selected from the group consisting of base metals, platinum group metals, oxides of base metals or platinum group metals, and combinations thereof;
    the magnetic material is capable of inductive heating in response to an applied alternating electromagnetic field, wherein the magnetic material comprises a rare-earth containing particulate material comprising neodymium-iron-boron or samarium-cobalt particles, and the magnetic material has an average particle size of less than about 100 nm.

2. The catalyst composition of claim 1, wherein the magnetic material is superparamagnetic.

3. The catalyst composition of claim 1, wherein the magnetic material comprises superparamagnetic iron oxide nanoparticles.

4. The catalyst composition of claim 1, wherein the catalytically active particles are further adapted for use as a diesel oxidation catalyst (DOC), a catalyzed soot filter (CSF), a lean NOx trap (LNT), a selective catalytic reduction (SCR) catalyst, an ammonia oxidation (AMOx) catalyst, or a three-way catalyst (TWC).

5. The catalyst composition of claim 1, wherein the catalytically active particles are further adapted for use as a volatile organic hydrocarbon (VOC) oxidation catalyst or a room temperature hydrocarbon oxidation catalyst.

6. The catalyst composition of claim 1, wherein the molecular sieve is a zeolite.

* * * * *